(12) United States Patent
Bontu et al.

(10) Patent No.: US 7,636,525 B1
(45) Date of Patent: Dec. 22, 2009

(54) SIGNAL ACQUISITION IN A COHERENT OPTICAL RECEIVER

(75) Inventors: Chandra Bontu, Nepean (CA); Kim B. Roberts, Nepean (CA); Han Sun, Nepean (CA); Edgar Velez, Kanata (CA); Kuang Tsan Wu, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 588 days.

(21) Appl. No.: 11/423,822

(22) Filed: Jun. 13, 2006

Related U.S. Application Data

(60) Provisional application No. 60/728,751, filed on Oct. 21, 2005.

(51) Int. Cl.
*H04B 10/06* (2006.01)

(52) U.S. Cl. .................................. 398/208; 398/209

(58) Field of Classification Search .......... 398/202–209
See application file for complete search history.

(56) References Cited

U.S. PATENT DOCUMENTS

| | | | |
|---|---|---|---|
| 4,506,388 A | 3/1985 | Monerie et al. | |
| 4,720,827 A | 1/1988 | Kanaji | |
| 4,723,316 A | 2/1988 | Glance | |
| 4,965,858 A | 10/1990 | Naito et al. | |
| 5,457,563 A | 10/1995 | Van Deventer | |
| 5,473,463 A | 12/1995 | Van Deventer | |
| 5,546,190 A * | 8/1996 | Hill et al. | 398/76 |
| 5,995,512 A | 11/1999 | Pogue et al. | |
| 6,473,222 B2 | 10/2002 | Hait et al. | |
| 6,607,311 B1 | 8/2003 | Fishman et al. | |
| 6,782,211 B1 | 8/2004 | Core | |
| 2002/0012152 A1 | 1/2002 | Agazzi et al. | |
| 2002/0181571 A1 * | 12/2002 | Yamano et al. | 375/222 |
| 2002/0186435 A1 | 12/2002 | Shpantzer et al. | |
| 2003/0063285 A1 | 4/2003 | Pering et al. | |
| 2003/0123884 A1 | 7/2003 | Willner et al. | |
| 2003/0175034 A1 | 9/2003 | Noe | |
| 2004/0033004 A1 * | 2/2004 | Welch et al. | 385/14 |
| 2004/0114939 A1 * | 6/2004 | Taylor | 398/152 |
| 2005/0047802 A1 * | 3/2005 | Jaynes et al. | 398/208 |

(Continued)

FOREIGN PATENT DOCUMENTS

EP   1453239 A1   9/2004

(Continued)

OTHER PUBLICATIONS

R. C. White, Jr., "A Survey of Random Methods for Parameter Optimization", Simulation vol. 17, No. 5, 1971.*

(Continued)

*Primary Examiner*—Quan-Zhen Wang
(74) *Attorney, Agent, or Firm*—Kent Daniels; Blake, Cassels & Graydon LLP

(57) ABSTRACT

A method and system for initializing a coherent optical receiver. Upon detection of an optical signal, a multi-bit digital sample stream of the optical signal is digitally processed to initialize each one of a plurality of adaptive control blocks of the coherent optical receiver. The adaptive control blocks include at least a dispersion compensation block and a clock recovery block. The dispersion compensation block is initialized before initializing the clock recovery block.

34 Claims, 11 Drawing Sheets

U.S. PATENT DOCUMENTS

2005/0058456 A1* 3/2005 Yoo .......................... 398/140
2005/0196176 A1 9/2005 Sun et al.

FOREIGN PATENT DOCUMENTS

| GB | 2214381 A | 8/1989 |
|---|---|---|
| WO | WO 00/60776 A1 | 10/2000 |
| WO | WO 02/27994 A1 | 4/2002 |

OTHER PUBLICATIONS

Isaac Shpantzer, Ph.D., "A New Generation of Coherent ULH Fiber-Optic Communication", CeLight Inc., 40 G Workshop, OECC-2002 Conference, Yokohama, Japan, Jul. 8, 2002, pp. 1-14.

Isaac Shpantzer, Ph.D. et al., "Coherent Optical Fiber Communication Architecture, Modeling and Optimization", CeLight Inc., SCEE 2002 Conference, Eindhoven, The Netherlands, Jun. 25, 2002, pp. 1-39.

M. Tseytlin et al., "Digital, endless polarization control for polarization multiplexed fiber-optic communications", CeLight Inc., OFC 2003, Mar. 24, 2003, pp. 1-14.

International Search Report for applicant's related International PCT Application PCT/CA2006/001458, Sep. 5, 2006.

International Search Report for applicant's related International PCT Application PCT/CA2006/001459, Sep. 5, 2006.

International Search Report for applicant's related International PCT Application PCT/CA2006/001460, Sep. 5, 2006.

Richard A. Linke, et al., "High-Capacity Coherent Lightwave Systems", Journal of Lightwave Technology, vol. 6, No. 11, Nov. 1988, pp. 1750-1769.

Chul-Ho Shin, et al., "Heterodyne Optical Phase-Locked Loop by Confocal Fabry-Perot Cavity Coupled AlGaAs Laser", IEEE Photonoics Technology Letters, vol. 2, No. 4, Apr. 1990, pp. 297-300.

D.-S. Ly-Gagnon, et al., "Coherent Detection of Optical Quadrature Phase-Shift Keying Signals with Carrier Phase Estimation", Journal of Lightwave Technology, vol. 24, No. 1, Jan. 2006, pp. 12-21.

Frowin Derr, "Coherent Optical QPSK Intradyne System: Concept and Digital Receiver Realization", Journal of Lightwave Technology, vol. 10, No. 9, Sep. 1992, pp. 1290-1296.

D.-S. Ly-Gagnon, et al., "Unrepeatered optical transmission of 20 Gbit/s quadrature phase-shift keying signals over 210 km using homodyne phase-diversity receiver and digital signal processing", Electronics Letters, vol. 41, No. 4, Feb. 17, 2005, pp. 1-2.

Y. Cia, et al., "On Performance of Coherent Phase-Shift-Keying Modulation in 40 Gb/s Long-Haul Optical Fiber Transmission Systems", OFC, Mar. 2006, pp. 1-3.

Matthias Seimetz, "Performance of Coherent Optical Square-16-QAM-Systems based on IQ-Transmitters and Homodyne Receivers with Digital Phase Estimation", OFC, Mar. 2006, pp. 1-10.

U. Koc, et al., Digital Coherent Phase-Shift-Keying (QPSK), OFC, Mar. 2006, pp. 1-3.

Satoshi Tsukamoto, et al., "Coherent Demodulation of Optical 8-Phase Shift-Keying Signals Using Homodyne Detection and Digital Signal Processing", OFC, Mar. 2006, pp. 1-3.

Kazuro Kikuchi, "Coherent Detection of Phase-Shift Keying Signals Using Digital Carrier-Phase Estimation", OFC, Mar. 2006, pp. 1-3.

B. Spinnler, "Chromatic Dispersion Tolerance of Coherent Optical Communications Systems With Electrical Equalization", OFC, Mar. 2006, pp. 1-3.

R.I. Killey, et al., "Electronic dispersion compensation by signal predistortion", OFC, Mar. 2006, pp. 1-3.

Satoshi Tsukamoto, et al., "Unrepeated 20-Gbit/s QPSK Tansmission over 200-km Standard Single-Mode Fiber Using Homodyne Detection and Digital Signal Processing for Dispersion Compensation", OFC, Mar. 2006, pp. 1-3.

S. Calabro, et al., "An electrical polarization-state controller and demultiplexer for polarization multiplexed optical signals", ECOC-IOOC, Sep. 2003, pp. 1-2.

Reinhold Noe, "Phase Noise-Tolerant Synchronous QPSK/BPSK Baseband-Type Intradyne Receiver Concept With Feedforward Carrier Recovery", Journal of Lightwave Technology, vol. 23, No. 2, Feb. 2005, pp. 802-808.

Reinhold Noe, "PLL-Free Synchronous QPSK Polarization Multiplex/Diversity Receiver Concept With Digital I&Q Baseband Processing", IEEE Photonics Technology Letters, vol. 17, No. 4, Apr. 2005, pp. 887-889.

Ezra Ip, et al., "Carrier Synchronization for 3-and 4-bit-per-Symbol Optical Transmission", Journal of Lightwave Technology, vol. 23, No. 12, Dec. 2005, pp. 4110-4124.

Yan Han, et al., "Coherent optical communication using polarization multiple-input-multiple-output", Optics Express, vol. 13, No. 19, Sep. 19, 2005, pp. 7527-7534.

L.E. Franks, "Carrier and Bit Synchronization in Data Communication-A Tutorial Review", IEEE Transactions on Communications, vol. COM-28, No. 8, Aug. 1980, pp. 1107-1121.

M. Cavallari, et al., "Electronic Signal Processing for Differential Phase Modulation Formats", OFC 2004, pp. 1-3.

A. Farbert, et al., "Performance of a 10.7 Gb/s Receiver with Digital Equaliser using Maximum Likelihood Sequence Estimation", ECOC 2004, Proceedings PD-Th4.1.5, Stockholm, pp. 1-2.

Yusuke Ota, et al., "High-Speed, Burst-Mode, Packet-Capable Optical Receiver and Instantaneous Clock Recovery for Optical Bus Opeanation", Journal of Lightwave Technology, vol. 12, No. 2, Feb. 1994, pp. 325-331.

\* cited by examiner

SIGNAL ACQUISITION IN A COHERENT OPTICAL RECEIVER

CROSS-REFERENCE TO RELATED APPLICATIONS

This application claims benefit under 35 U.S.C. 119(e) from U.S. Provisional Patent Application Ser. No. 60/728,751, entitled Automatic Gain Control, which was filed on Oct. 21, 2005.

TECHNICAL FIELD

The present invention relates to optical communications networks, and in particular to signal acquisition in a coherent optical receiver.

BACKGROUND OF THE INVENTION

In the optical communications space, receivers based on coherent detection techniques have suffered disadvantages that have, to date, prevented successful deployment in "real-world" installed communications networks.

One such limitation is that both the transmitted carrier signal and the receiver's local oscillator (LO) signal are generated by respective transmitter and LO lasers, which, in the case of "real world" network systems, will be compact fiber or semi-conductor lasers which are subject to manufacturing and environmental variations. Such lasers are typically designed such that the average output frequency (over a period of 100 s of milliseconds or more) is stable at a value which is nominally fixed by the frequency setting. However, short period frequency excursions due to laser line width and phase noise are permitted. As a result, frequency variations of as much as ±400 MHz, at rates on the order of up to 50KHz are commonly encountered. The resulting frequency mismatch Δf between the LO signal and the received carrier signal appears as a phase error in recovered symbols, which can lead to erroneous data detection.

In prior art coherent receiver systems, this problem is typically addressed by implementing an optical frequency locked loop (FLL) or Phase locked loop (PLL) to actively control the receiver's LO to match the received carrier signal. FLL and PLL circuits for this purpose are described in: "High Capacity Coherent Lightwave Systems", Linke et al, Journal of Lightwave Technology, Vol. 6, No. 11, November 1988; "Heterodyne Phase Locked Loop by Confocal Fabry-Perot Cavity Coupled AlGaAs lasers", Shin et al, IEEE Photonics Technology Letters, Vol. 2, No. 4, April 1990; and "Carrier Synchronization for 3 and 4-bit-per-Symbol Optical Transmission", Ip et al, Journal of Lightwave Technology, Vol. 23, No. 12, December 2005. All of these systems operate to drive the receiver's LO to precisely track excursions of the received optical carrier. A limitation of this approach is that for optical communications systems with multi-gigabit line rates, a PLL/FLL loop bandwidth on the order of hundreds of MHz is needed to effectively compensate the laser phase noise. This is difficult to achieve at acceptable cost.

An alternative approach is to use an electrical carrier recovery circuit for detecting and compensating the frequency mismatch between the LO and received carrier. A carrier recovery circuit designed for this purpose is described in "Phase Noise-Tolerant Synchronous QPSK/BPSK Baseband-Type Intradyne Receiver Concept With Feedforward Carrier Recovery", R Noé, Journal of Lightwave Technology, Vol. 23, No. 2, February 2005. A limitation of electrical carrier compensation in this manner is that it can only feasibly compensate some aspects of moderate frequency errors. As a result, a large frequency transient can cause severe performance degradations, for example due to limited analog amplifier bandwidth, and clock recovery issues.

A further limitation of coherent detection systems is that they are highly vulnerable to optical impairments of the received carrier signal. In particular, optical signals received through conventional optical links are distorted by significant amounts of chromatic dispersion (CD) and polarization dependent impairments such as Polarization Mode Dispersion (PMD), polarization angle changes and polarization dependent loss (PDL). Chromatic dispersion (CD) on the order of 30,000 ps/nm, and polarization rotation transients at rates of $10^5$Hz are commonly encountered.

Various methods of compensating Polarization angle are known in the art. See, for example, "Phase Noise-Tolerant Synchronous QPSK/BPSK Baseband-Type Intradyne Receiver Concept With Feedforward Carrier Recovery", R Noé, Journal of Lightwave Technology, Vol. 23, No. 2, February 2005, and "PLL-Free Synchronous QPSK Polarization Multipex/Diversity Receiver Concept with Digital I&Q Baseband Processing", R Noé, IEEE Photonics Technology Letters, Vol. 17, No. 4, April 2005. In this respect, it will be noted that Noé also alludes (in the introduction) to the possibility of also compensating chromatic dispersion. However, Noé does not provide any teaching as to how this would be done. The applicability of RF channel estimation techniques to the detection of polarization-division multiplexed optical signals in a quadrature coherent receiver is described by Y. Han et al. in "Coherent optical Communication Using Polarization Multiple-Input-Multiple-Output", OPTICS EXPRESS Vol. 13, No. 19, pp 7527-7534, 19 Sep. 2005.

A limitation that is common throughout the prior art is a lack of satisfactory bandwidth of the various compensation functions. For example, the FLL/PLL and carrier recovery techniques described above are intended to track (and thus compensate) laser phase noise. However, in order to provide sufficient accuracy of compensation, they lack sufficient bandwidth to acquire a signal across the entire possible range of impairment magnitude, such as a frequency error of several GigaHertz. As a result, these systems cannot reliably acquire a signal and stabilize to steady-state operation, even if they could track laser phase transients after a steady state had been achieved. Similarly, the system of Noé [supra] is designed to compensate polarization rotations, but it cannot track high speed transients of the type encountered in real-world communications networks. For example, Noé, claims that with a 10 GBaud signal, the inverse Jones matrix coefficients can be updated with a period of 16 μs. This is far too slow to successfully compensate 20 kHz polarization rotations, which have a period of 50 μs. In addition, the system of Noé tends to fail in the presence of severe Chromatic Dispersion (CD), at least in part due to failure of the clock recovery circuit as inter-symbol interference (ISI) increases, and consequent uncertainty of the sample timing of the A/D converters. While it is mathematically possible to design a filter function that compensates both polarization and chromatic dispersion (as alluded to by Noé), the prior art does not offer any methods by which satisfactory compensation accuracy can be obtained with an adaptation speed high enough to track real-world polarization transients. It follows that the system of Noé will not be able to reliably capture the instantaneous polarization state of the received signal during start-up, especially in the presence of high speed transients, and thus cannot guarantee that it will achieve a stable steady-state operation.

Prior art clock recovery systems suffer the same limitation, in that the PLL bandwidth required to obtain a satisfactory sample phase accuracy is significantly less than the possible range of clock and channel errors. As a result, conventional clock recovery circuits cannot reliably acquire a lock condition, even if they are able to maintain lock once it has been achieved. A further limitation of clock recovery circuits is that they are very vulnerable to distortions in the received optical signal. While this can be overcome by compensating at least some of the distortions prior to the clock recovery circuit, such compensation normally requires the recovered clock signal in order to operate. As a result, the receiver cannot reliably acquire signal and achieve a steady state operation, even if such a state can be maintained once it has been achieved.

Accordingly, methods and techniques that enable a coherent optical receiver to reliably acquire signal and achieve steady-state operation remain highly desirable.

SUMMARY OF THE INVENTION

An object of the present invention is to provide methods and techniques that enable a coherent optical receiver to reliably acquire signal and achieve steady-state operation.

Thus, an aspect of the present invention provides a method of initializing a coherent optical receiver. An optical signal is detected. A multi-bit digital sample stream of the optical signal is then processed to initialize each one of a plurality of adaptive control blocks of the coherent optical receiver. The plurality of adaptive control blocks include at least a dispersion compensation block and a clock recovery block, of which the dispersion compensation block is initialized before initializing the clock recovery block.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides methods and techniques that enable reliable signal acquisition and stabilization to steady-state operation of a coherent receiver unit of an optical communications network. Embodiments of the present invention are described below, by way of example only, with reference to FIGS. 1-10.

In general, the present invention provides methods in which a multi-bit sample stream of a received optical signal is digitally processed to find receiver parameters which compensate link impairments with sufficient accuracy that any residual distortions are within a pull-in range of "steady-state" adaptation loops of the receiver. As a result, signal acquisition and steady-state operation of the receiver can be achieved with a high degree of reliability, even in the presence of moderate to severely distorted optical signals.

Figure 1:
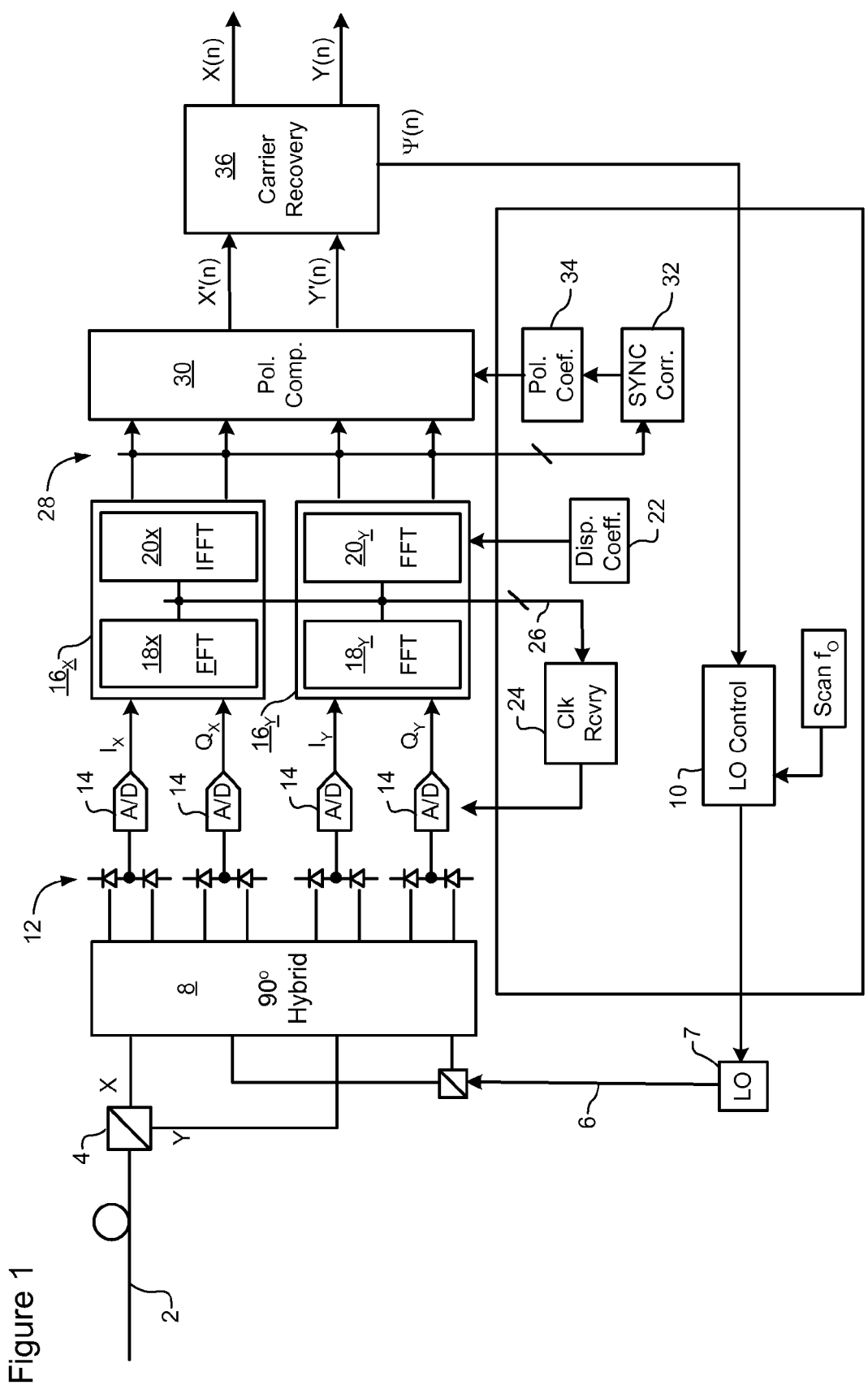
FIG. 1 is a block diagram schematically illustrating principal elements and operations of a coherent optical receiver in which methods in accordance with the present invention may be implemented.

FIG. 1 schematically illustrates a representative coherent optical receiver in which methods of the present invention may be implemented. In the coherent optical receiver of FIG. 1, an inbound optical signal is received through an optical link 2, split into orthogonal polarizations by a Polarization Beam Splitter 4, and then mixed with a Local Oscillator (LO) signal 6 by a conventional 90° optical hybrid 8. An LO controller 10 is provided to control the frequency of the LO 6 to minimize a frequency mismatch $\Delta f$ between the LO 6 and the carrier of the inbound optical signal. The composite optical signals emerging from the optical hybrid 8 are supplied to respective photodetectors 12, which generate corresponding analog signals. The photodetector signals are sampled by respective Analog-to-Digital (A/D) converters 14 to yield multi-bit digital sample streams corresponding to In-phase (I) and Quadrature (Q) components of each of the received polarizations. Although two photodetectors 12 are shown for each A/D 14 in FIG. 1, in some embodiments only one photodetector can be used for each A/D with satisfactory performance.

As may be appreciated, the resolution of the A/D converters 14 is a balance between performance and cost. Increasing the resolution improves sampling accuracy, and thereby improves the extent to which signal distortions can be corrected by downstream dispersion and polarization compensators. However, this increased accuracy is obtained at a cost of increased complexity, silicon area and heat generation. It has been found that a resolution of 5 or 6 bits provides satisfactory performance, at an acceptable cost. Preferably, the sample rate of the A/D converters 14 is selected to satisfy the Nyquist criterion for the highest anticipated symbol rate of the received optical signal. As will be appreciated, Nyquist sampling ensures that the sample streams generated at the A/D converter output contains all of the information content of each signal, even if the sample timing (with reference to each received symbol) is ambiguous and/or unknown. From the A/D converter 14 block, the I and Q sample streams of each received polarization are supplied to a respective dispersion compensator 16, which operates on the sample stream(s) to compensate chromatic dispersion of the optical link.

In the embodiment of FIG. 1, each dispersion compensator 16 is implemented using a Fast Fourier Transform (FFT) filter 18 cascaded with an Inverse Fast Fourier Transform (IFFT) filter 20. The FFT filters 18 operate in a known manner to compute the spectrum of each received polarization, and apply a first order dispersive function which at least partially compensates chromatic dispersion of the link 2. The cascaded IFFT filters 20 process the output of the FFT filter 18 to generate dispersion compensated I and Q sample streams.

As will be appreciated, the amount of dispersion that can be compensated will be a function of the width of the FFT/IFFT filters 18 and 20, which will be a balance between performance and cost. In some embodiments, each filter has a width of 256 samples, which enables compensation of well over 10000 ps/nm of dispersion. A dispersion training loop 22 for calculating the dispersion compensator coefficients (and thereby training the dispersion compensator) can be implemented using a variety of methods, as will be described in greater detail below.

A dispersion compensation block can be linear or nonlinear, or some combination of both. The FFT method described above is a particularly efficient linear implementation when used in a coherent optical receiver.

A clock recovery block 24 taps the dispersion compensators 16 to obtain an at least partially dispersion compensated sample stream 26, which is then used for recovering a clock signal, as will be described in greater detail below.

The dispersion-compensated sample streams 28 appearing at the output of the dispersion compensators 16 are then supplied to a polarization compensator 30 which operates to de-convolve the transmitted I and Q signal components of each transmitted polarization from the dispersion-compensated sample streams 28. Various methods may be used to implement the polarization compensators 30, such as, for example, a Finite Impulse Response (FIR) filter. A polarization training loop including a SYNC detector 32 and a coefficient calculator 34 compute updated filter coefficients which are then downloaded to the polarization compensator 30 to track and compensate polarization impairments, as will be described in greater detail below.

The distortion-compensated sample streams appearing at the output of each polarization compensator 30 are then supplied to a carrier recovery block 36 for compensating residual frequency mismatch $\Delta f$ between the LO and the carrier of the received optical signal, as well as symbol detection (for data recovery).

Figure 2:
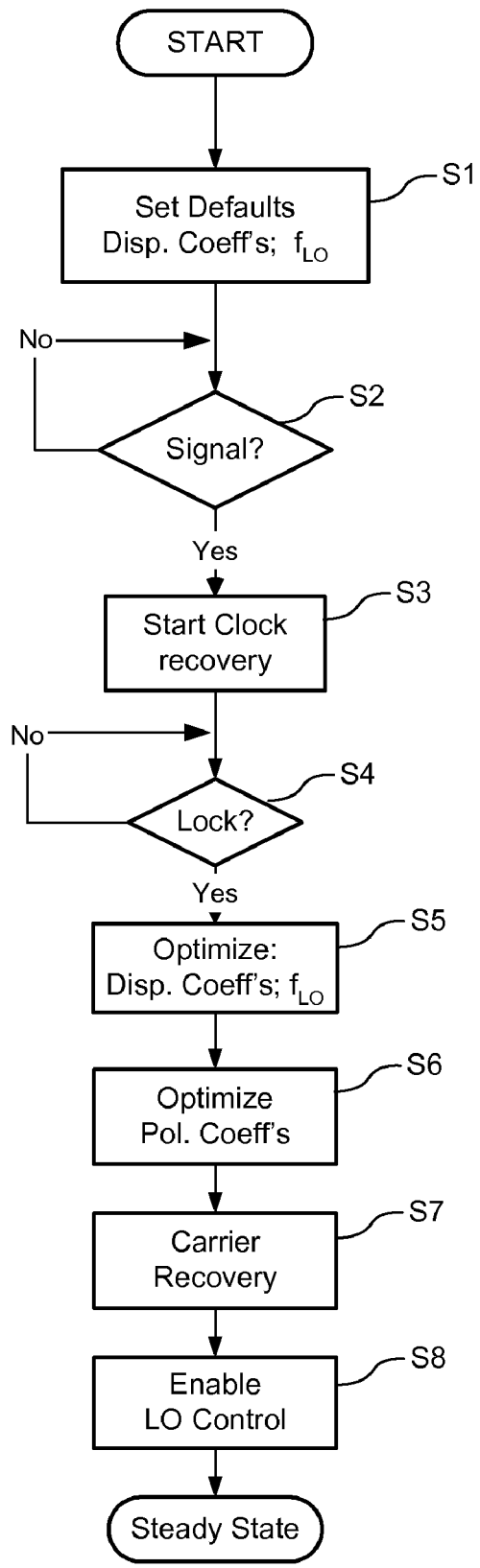
FIG. 2 is a flow chart illustrating principle steps in a method of signal acquisition in accordance with an embodiment of the present invention.

As will be appreciated from the foregoing description, signal acquisition, and achievement of steady-state operation of the coherent optical receiver of FIG. 1, requires initialization and training of each of the LO control, dispersion compensation, clock recovery and polarization compensation training loops. FIG. 2 is a flow chart illustrating principal steps in a representative process for initialization (that is, signal acquisition and achievement of steady-state operation) of the coherent optical receiver of FIG. 1.

As may be seen in FIG. 2, upon initial start-up (e.g. power on or reset), initial values of at least the dispersion compensation coefficients are loaded into the dispersion compensators (at step S1). As will be described in greater detail below, these initial coefficient values may be obtained by various means, and stored for use during start-up. When an in-bound optical signal is detected (at S2), the clock recovery loop 24 initializes (at S3) by acquiring the detected signal and subsequently stabilizing to a lock-condition, which ensures that the A/D converters 14 are driven to sample the photodetector current(s) with an appropriate sample phase and frequency. Once the clock recovery loop 24 has achieved a lock condition (at S4), the dispersion compensation coefficients can be optimized (at S5) to yield dispersion compensated sample streams having minimal residual dispersion at the output of the dispersion compensators 16. Based on the dispersion compensated sample stream, the polarization compensation loop 32, 34 and carrier recovery block 36 can initialize (at steps S6 and S7), and thereby begin tracking (and compensating) polarization impairments and sample phase errors. Once the carrier recovery block 36 has stabilised, the LO control loop 10 can be enabled (at S8), to provide ongoing adaptive control of the LO frequency. Each of the foregoing functions will be described in the following sections.

Determination of the Presence of a Signal

The acquisition process described above with reference to FIG. 2 starts with the detection of an inbound optical signal; that is, the determination that an optical signal (as opposed to just Amplified Spontaneous Emission [ASE] and thermal noise) is present in the optical link 2. In some cases, this determination is a simple matter of comparing the photodetector current to a predetermined threshold level, which is selected to distinguish between photodetector current due to received Amplified Spontaneous Emission (ASE) and thermal noise on the one hand, and a received optical signal on the other. A dispersed, polarization diverse phase modulated signal of unknown carrier frequency can be very difficult to distinguish from a significant level of ASE. Sensitive methods to determine the presence of a signal are described below.

As will be appreciated, more sophisticated techniques may be employed to determine the presence of an optical signal by analysing optical characteristics of the received light.

LO Control

As mentioned above, the LO control loop 10 is used to control the frequency of the LO 6 to minimize frequency mismatch $\Delta f$ between the LO and the carrier of the inbound optical signal. As is well known in the art, conventional optical PLL/FLL loops are capable of driving the frequency mismatch $\Delta f$ to near zero, but lack sufficient loop bandwidth to be able to reliably acquire a signal across the entire possible frequency mismatch range. For example, conventional semiconductor lasers of the type commonly used in optical communications may exhibit frequency transients of as much as ±400 MHz from the nominal frequency, which implies a possible mismatch range of ±800 MHz. Laser line width and manufacturing variations can be expected to increase this. Modern tuneable lasers may exhibit a tuning range of as much as ±3600 MHz. Accordingly, the present invention implements an LO-scan operation, in which the frequency of the LO is varied (e.g. using a predetermined update rate and step size) until the frequency mismatch $\Delta f$ falls within the pull-in range of the optical PLL/FLL loop.

Figure 3A:
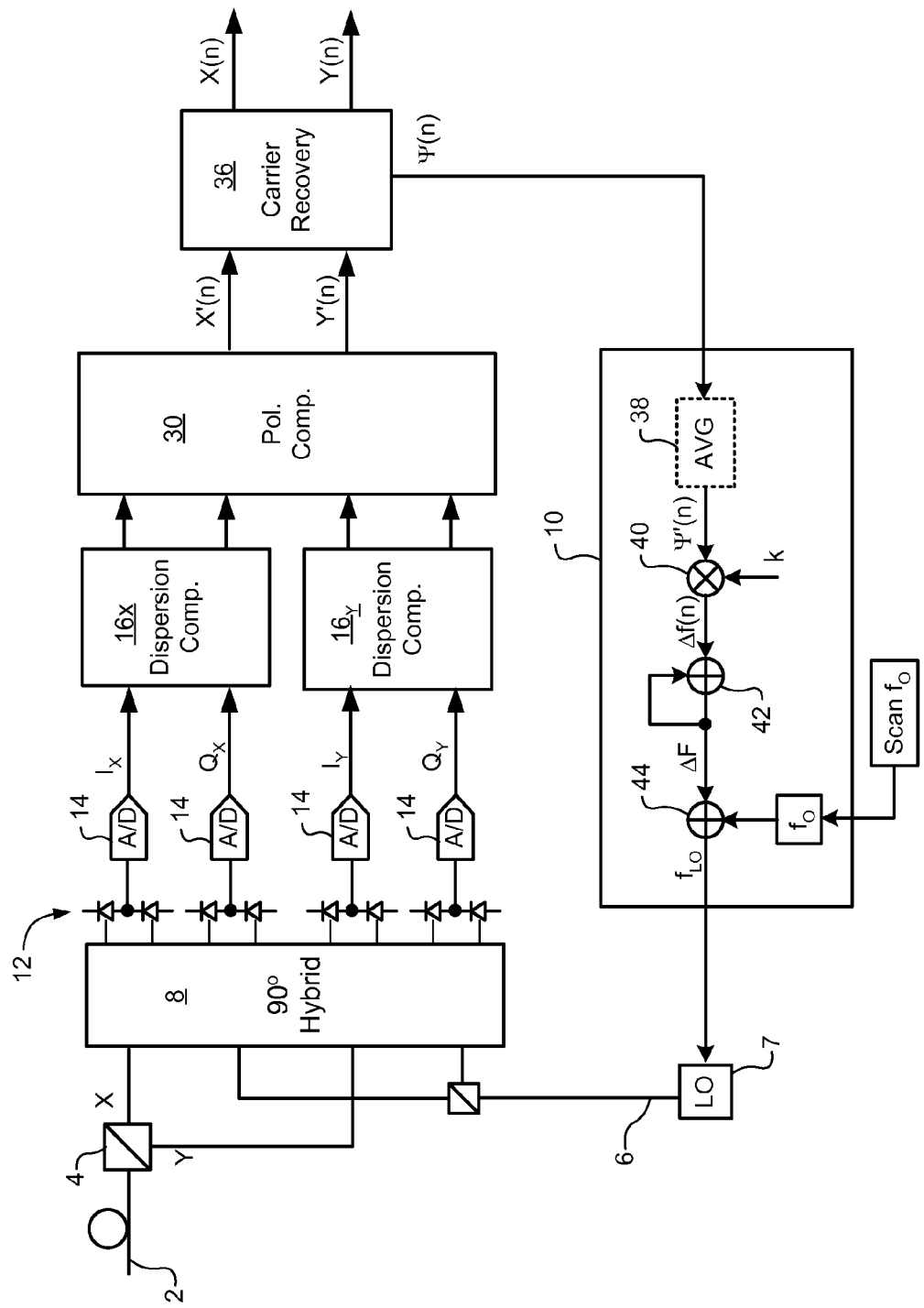
FIGS. 3a-3b are block diagrams schematically illustrating principal elements and operations of the LO control clock of the coherent optical receiver of FIG. 1, in greater detail.
Figure 3B:
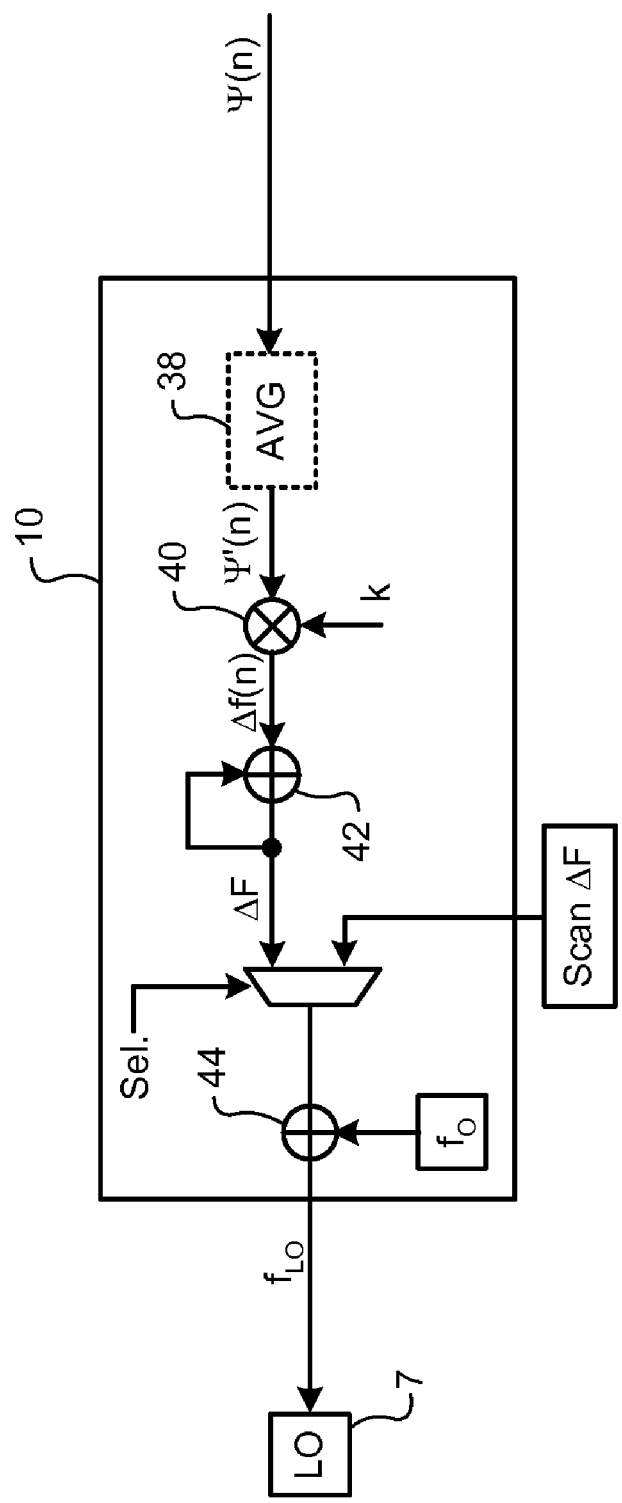

FIG. 3a illustrates a laser control loop 10 in accordance with Applicant's co-pending U.S. patent application Ser. No. 11/279,042 filed Apr. 6, 2006. In the embodiment of FIG. 3a, a frequency mismatch parameter $\psi(n)$ computed by the carrier recovery block 36 provides a multi-bit estimate of the frequency mismatch $\Delta f$ between the received carrier and the LO. Successive frequency mismatch parameter values $\psi(n)$ ($0 \leq n \leq N$) can be averaged (at 38) to yield a low-pass filtered mismatch parameter $\psi'(n)$ in which variations above a few 100 s of Hertz, for example, are suppressed. As may be appreciated, the frequency mismatch parameter $\psi(n)$ calculated by the carrier recovery block 36, and thus the filtered mismatch parameter $\psi'(n)$ already contains the sign of the frequency mismatch. As a result, the filtered mismatch parameter values ψ'(n) can be scaled (at 40) to obtain the corresponding frequency mismatch value Δf(n), which can then be used directly to adjust the LO frequency setting $f_{LO}$. In the embodiment of FIG. 3a, this is accomplished by accumulating (at 42) successive frequency mismatch values Δf(n) to obtain a frequency adjustment ΔF, which is then combined with a default LO frequency setting $f_O$ (at 44) to obtain the frequency setting $f_{LO}$ supplied to the LO 7.

Clearly, computation of the frequency mismatch parameter ψ(n), and thus the frequency adjustment ΔF, requires that the dispersion compensators and polarization compensators have already acquired signal and achieved steady-state operation. Prior to this, the frequency adjustment ΔF can be held to a value of zero (or otherwise discarded), so that the default LO frequency setting $f_O$ governs the LO frequency setting $f_{LO}$. As a result, the initial frequency mismatch will normally be limited to the known performance tolerances of the Tx and LO lasers.

Using the above LO control loop 10, an LO-scan operation can be readily implemented by iteratively adjusting the value of the "default" LO frequency setting $f_O$. An alternative arrangement is to hold the default LO frequency setting $f_O$ constant, and iteratively adjust the frequency adjustment value ΔF, as may be seen in the embodiment of FIG. 3b. In some embodiments, the LO-scan may be provided as a linear scan which simply progresses through the entire tuning range of the LO 7. However, any of a variety of techniques may be used to optimize the scan operation so as to reduce the mean time to signal acquisition. Thus, for example, the scan may be limited to a range of frequencies around the expected frequency of the carrier. The size of the range and/or the scanning step size may be varied as desired. Thus, for example, if an initial scan through a selected frequency range is unsuccessful, the scanning range may be increased to widen the search and/or the step-size may be decreased.

If desired, the optimum LO frequency (as determined by any of the above methods) may be sent to a transmitter end of the optical link, for example as part of a hand-shake protocol used during System Layout and Test (SLAT) of the optical link.

Figure 4:
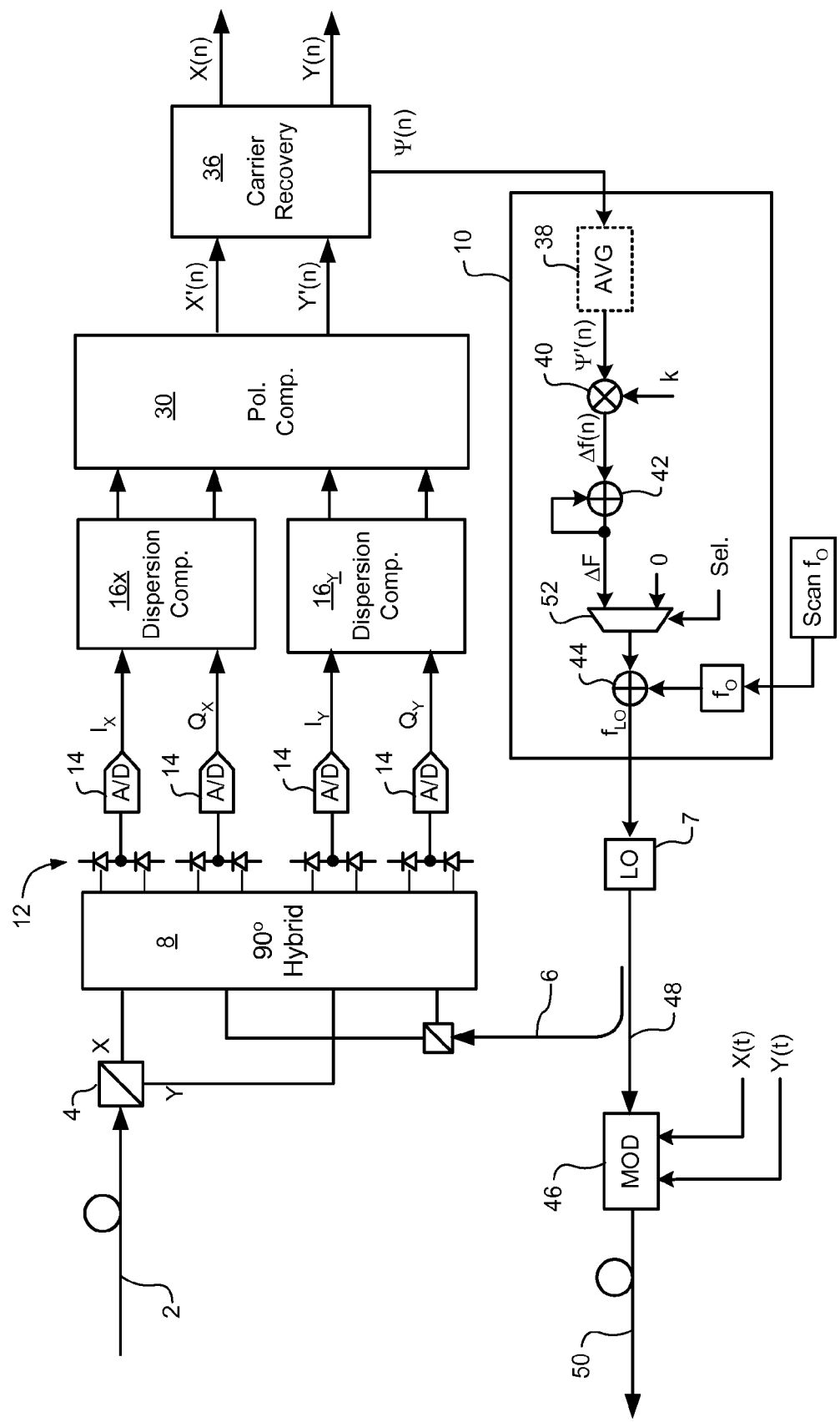
FIG. 4 is a block diagram schematically illustrating principal elements and operations of an LO control block implemented in a line card having a coherent optical receiver and a transmitter, and in which a common LO is used for both transmission and coherent reception functions.

FIG. 4 schematically illustrates an embodiment in which the local oscillator is also used as a transmit laser for transmitting an outgoing optical signal. This arrangement may, for example, be useful in a line card terminating a bi-directional optical link. In such cases, the line card contains a coherent optical receiver of the type described herein, for receiving an optical signal from a remote node at the opposite end of the link. In addition, a modulator 46 operates in a known manner to modulate one or more data signals (X(t), Y(t)) onto an optical carrier 48 generated by the local oscillator 7, to thereby generate an outbound optical signal 50 which is transmitted to the remote node.

As mentioned above, the LO control loop 10 of FIG. 3 minimizes the frequency mismatch Δf between the LO signal 6 and received carrier by adjusting the LO frequency setting $f_{LO}$. In the arrangement of FIG. 4, this operation also adjusts the carrier frequency of the outbound optical signal 50. In a system where the frequency setting of the remote node's Tx laser is substantially fixed, this operation is inherently stable, and the entire optical link will track the frequency of the remote node's Tx laser. However, if the line cards terminating both ends of the link utilize LO control loops of the type illustrated in FIG. 3, the system will be unstable, because both nodes will be continuously adjusting its respective LO frequency setting (and thus the carrier frequency received by the other node).

In the embodiment of FIG. 4, this problem is addressed by including a switch function 52 which permits the carrier tracking function to be selectively enabled and disabled. With this arrangement, a "hand-shaking" protocol can be implemented, in which one node is selected as a "master", and fixes its respective LO frequency setting by disabling its LO tracking function. The other end node can then operate as described above to adjust its respective LO frequency to minimize the frequency mismatch with the master node.

Figure 6:
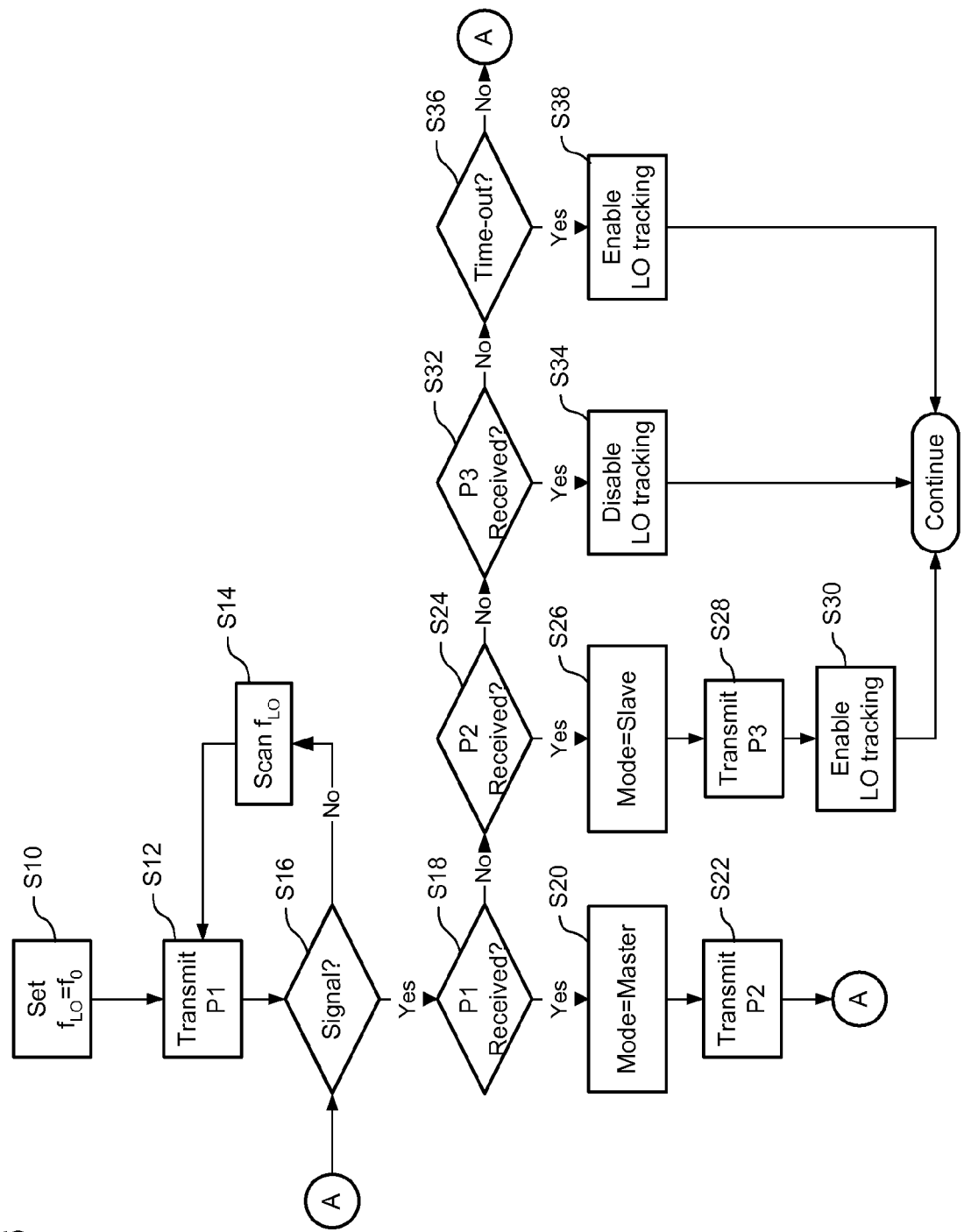
FIG. 6 is a flow chart illustrating principle steps in a handshaking protocol that may be implemented in the bi-direction optical link of FIG. 5.

Various methods may be used to implement the hand-shaking protocol. FIG. 6 is a flow chart illustrated principal steps in a representative hand-shaking protocol which may be implemented in the line card of FIG. 4. As shown in FIG. 6, upon start-up (e.g. power-on or re-set) the LO frequency setting is set (at S10) to the default value $f_0$, and an optical signal containing a first pilot signal P1 is transmitted (at S12). The first pilot signal P1 is generally indicative that the line card has commenced its start-up and signal acquisition sequence. Preferably, the first pilot signal P1 is selected to be polarization independent and highly robust to dispersion, so as to maximize the probability that it can be detected by the receiver at the other end of the link. The frequency setting $f_{LO}$ can be scanned (at S14) as described above until a valid data signal is detected (at S16) in the inbound optical signal received from the remote node. One method of determining that a valid data signal has been received is to monitor the lock condition of the clock recovery circuit 24. Achievement of a lock condition indicates that symbols are being detected within the received optical signal at the expected symbol rate, and that these symbols are being sampled at an appropriate sample phase. Other methods will be apparent to those of ordinary skill in the art.

When a valid data signal is detected, the signal is examined (at S18) to determine if it contains the first pilot signal P1. If the first pilot signal P1 is detected, then the line card enters a "master" mode of operation (at 520), and transmits (at S22) a second pilot signal P2 that is indicative of this state. Preferably, the second pilot signal P2 is selected to be polarization independent and highly robust to dispersion, because it is assumed that the remote node may still be attempting to detect a valid signal. The line card then resumes monitoring the incoming signal from the remote node.

If the received signal does not contain the first pilot signal P1, then the signal is examined (at S24) to determine if it contains the second pilot signal P2. If the second pilot signal P2 is detected, then it is known that the remote node has already entered the "master" mode of operation. Accordingly, the line card enters a "slave" mode (at 526), and transmits an acknowledgement signal P3 (at S28) that is indicative of this state. The line card then enables (at S30) carrier frequency tracking by the LO controller 10, so that the LO frequency can be continuously adjusted to minimize the frequency mismatch Δf between its LO and the carrier of the received optical signal (from the master node). The line card can then continue its start-up and signal acquisition sequence as may be required in order to enter steady state operation.

If the received signal does not contain either the first or second pilot signals P1 and P2, then the signal is examined (at S32) to determine if it contains the acknowledgement signal P3. If the acknowledgement signal P3 is detected, then it is known that the remote node has entered the "slave" mode of operation, and is therefore adjusting its LO frequency setting $f_{LO}$ to track changes in the local (master) line card's LO frequency. Accordingly, the line card disables carrier frequency tracking (at S34) to hold its LO frequency setting $f_{LO}$ constant, and then continues its start-up and signal acquisition sequence as may be required in order to enter steady state operation.

If none of above signals P1-P3 are detected in the received optical signal within a predetermined time-out period, then it may be assumed that the remote node cannot participate in the hand-shaking protocol. This may occur, for example, in cases where the remote node uses a conventional line card in which independent lasers are used for transmission and coherent reception. Accordingly, upon a time-out (at S36), the line card enables carrier frequency tracking (at S38), so that the LO frequency can be continuously adjusted to minimize the frequency mismatch Δf between its LO and the carrier of the received optical signal. The line card can then continue its start-up and signal acquisition sequence as may be required in order to enter steady state operation.

An advantage of the foregoing hand-shaking protocol is that it enables the line card to establish appropriate control of its LO frequency, and ensure stable operation of the optical link, independently of whether or not the remote node contains a similar line card. In fact, legacy line cards with conventional direct detection receivers can be used at the remote node, if desired, without adversely interrupting operation of the above hand-shaking protocol.

Figure 5:
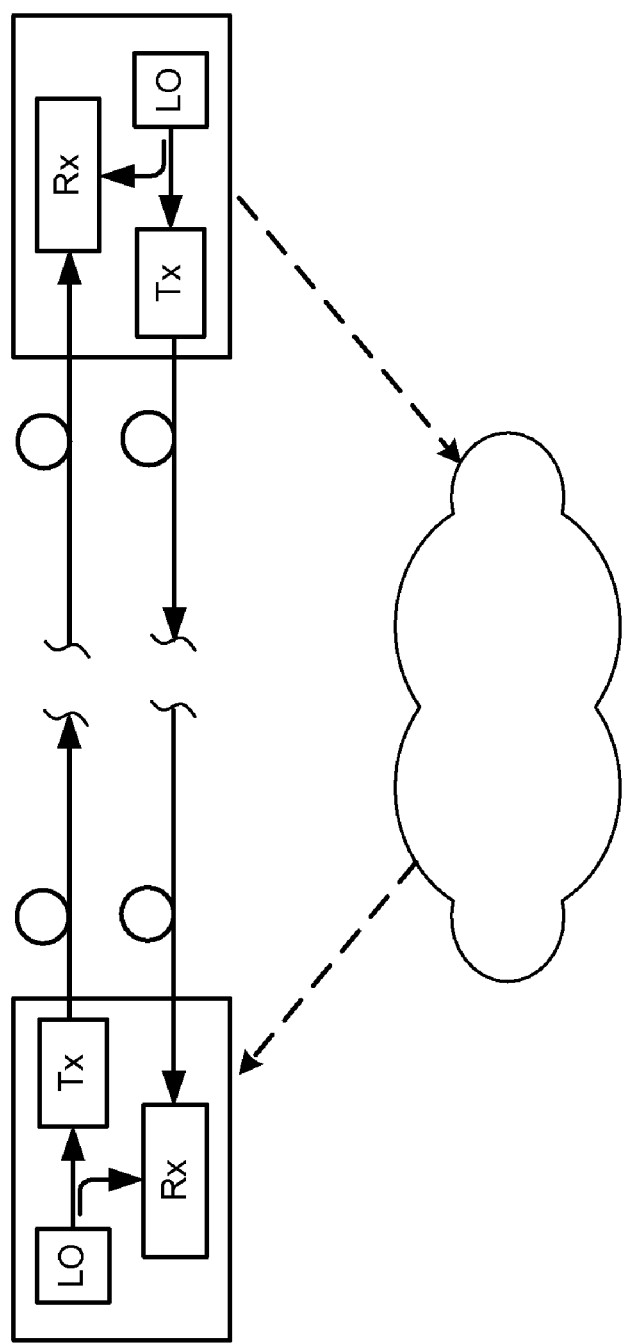
FIG. 5 is a block diagram schematically illustrating a bi-direction optical link incorporating a pair of line cards in accordance with FIG. 4.

In the foregoing hand-shaking protocol, a set of pilot and acknowledgement signals are used to establish continuity and assert (and acknowledge) master/slave modes of operation. As noted above, these signals are transmitted "in-line" through the optical link. However, it will be appreciated that this is not necessary. For example, information concerning the successful detection of a signal, assertion of master/slave status etc. could be conveyed through a control channel, or via a system management network, as shown in FIG. 5.

Dispersion Compensation

As mentioned above, the dispersion compensators 16 implement a fist order dispersive function which at least partially compensates chromatic dispersion of the optical link 2. A dispersion control loop 22 for calculating the dispersion compensator coefficients (and thereby training the dispersion compensators) can be implemented using a variety of methods.

Figure 7C:
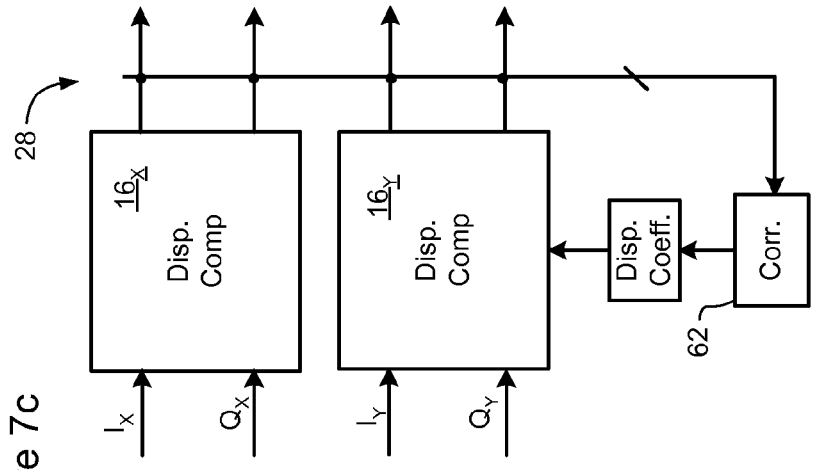
FIGS. 7a-7c are block diagrams schematically illustrating respective dispersion compensation loops usable in an embodiment of the present invention.
Figure 7A:
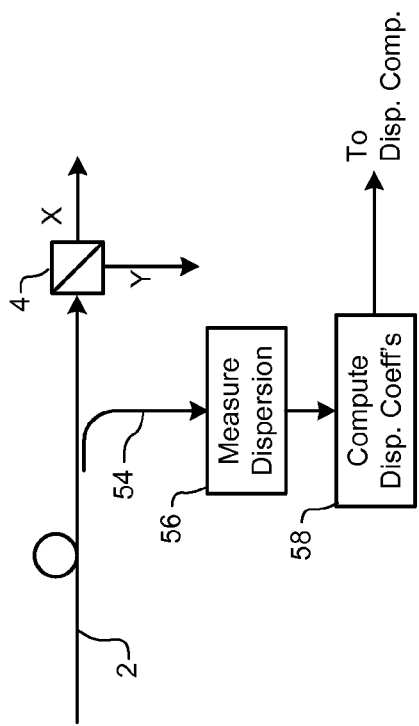
Figure 7B:
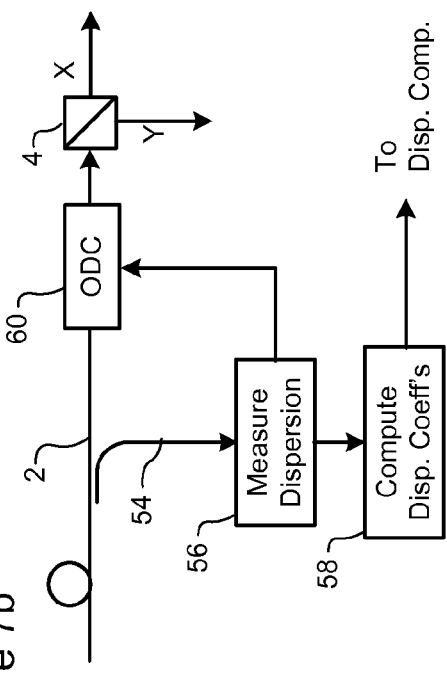

In some embodiments, the total chromatic dispersion may be known from measurements taken during installation of the optical link 2, or estimated from known physical characteristics of the optical fibre and equipment provisioned within the optical link 2. FIGS. 7a-c illustrate respective alternative methods for implementing a dispersion control loop which provides at least quasi-real-time training of the dispersion compensation function. In the example of FIG. 7a, the inbound optical signal is tapped immediately upstream of the polarization beam splitter 4, and the tapped optical signal 54 used to measure the total chromatic dispersion (at 56) using known methods. The measured dispersion can then be used to compute coefficients of the fist order dispersive function (at 58), which can then be downloaded to the dispersion compensators 16. FIG. 7b illustrates an alternative arrangement, in which an optical dispersion compensator 60 is inserted into the optical path upstream of the polarization beam splitter 4. In this case, the optical dispersion compensator 60 uses the measured dispersion to impose a negative dispersion function on the inbound optical signal to at least partially compensate to total chromatic dispersion of the link 2. This arrangement can reduce the amount of chromatic dispersion that must be electronically compensated by the dispersion compensators 16.

A still further alternative approach is illustrated in FIG. 7c, in which a dispersion control loop is implemented to optimize the dispersion compensator coefficients. In general, a candidate dispersion value is selected, and a respective set of coefficients (precomputed to compensate the candidate dispersion) are downloaded to the dispersion compensators 16. The "compensated" sample streams 28 appearing at the output of the dispersion compensators 16 are then analysed to assess the residual dispersion. This residual dispersion is then used to determine an adjustment direction and/or step size for adjusting the candidate dispersion value. This process of selecting a candidate dispersion value; calculating and downloading respective compensation coefficients to the dispersion compensators; and then determining residual dispersion can continue until the residual dispersion is reduced to an acceptable value.

Various known methods may be used to determine the residual dispersion within the "compensated" sample streams 28. For example, a correlation can be computed (at 62) between the "compensated" sample streams 28 and a known pilot signal within the received optical signal. If the known pilot signal is substantially independent of polarization, then the resulting correlation value will be indicative of residual dispersion. In some cases, the pilot signal may conveniently be provided as SYNC bursts comprising a predetermined sequence of SYNC symbols described in greater detail below. With this arrangement, computing a correlation between the "compensated" sample streams 28 appearing at the output of the dispersion compensators 16 and the known SYNC symbol sequence provides a direct indication of the residual dispersion. Other types of signals may be used as the pilot signal, as will be readily apparent to those skilled in the art.

As will be appreciated, if the total dispersion is sufficiently high, it will exceed the "pull-in range" of the dispersion control loop, in the sense that changing the candidate dispersion value will yield no change in the computed correlation, and thus no useful information to guide changes in the adjustment step size and direction. This can be overcome by implementing a "dispersion scan" function, in which the candidate dispersion is forced to scan through a desired range of possible values, until it falls within the pull-in range of the dispersion control loop.

If desired, the dispersion scan process can be designed to scan dispersion values spanning a range of ±50,000 ps/nm, or more, with a desired scan rate and step size. Other scan ranges, and any of a variety of search strategies may be implemented to optimize the dispersion scan operation, and thereby minimize the mean time to signal acquisition.

If desired, the dispersion scan operation may be combined with the LO frequency scan described above. Thus, for example, both of the scan operations can run simultaneously, and may use the same criteria to terminate both scan operations. This combined operation is based on the recognition that, for a polarization independent pilot signal, residual distortion at the dispersion compensator output will be a function of both total link dispersion and the frequency mismatch Δf. Since these parameters are orthogonal, a 2-Dimensional control surface can be defined which relates the total dispersion compensated by the dispersion compensators 16 and the LO frequency setting $f_{LO}$ to the pilot signal correlation value, for example. Signal acquisition then becomes a process of mapping the control surface to find optimum values of the dispersion compensation coefficients and LO frequency setting $f_{LO}$. One way of doing this is by scanning both parameters at the same time until the computed correlation value reaches a local maximum. The respective scan rates and/or step sizes of each parameter are preferably different, which allow the effects of changes in each parameter on the residual dispersion to be distinguished, so that appropriate decisions regarding step size and direction for each parameter can be made.

If desired, the total dispersion (as determined by any of the above methods) may be sent to the remote node at opposite end of the optical link, for example as part of a hand-shake protocol used during System Layout and Test (SLAT) of the optical link.

Clock Recovery

As noted above, the clock recovery loop 24 taps the dispersion compensators 16 to obtain a (partially) dispersion compensated sample stream 26, which is then used for recovering a clock signal. During an initial phase of operation, a nominal clock can be used to drive the A/D converters 14, so as to generate sample streams having an appropriate sample rate, but with an indeterminate sample timing. As mentioned above, the sample rate is preferably selected to satisfy the Nyquist criterion for the expected symbol rate of the received optical signal. This provides valid multi-bit sample streams which can be input to the dispersion compensators 16 to initialize the dispersion compensation loop. Thus, for example, in an embodiment implementing the dispersion scan operation described above with reference to FIG. 7c, the sample streams (even with indeterminate sample timing) contain sufficient information to enable detection of residual dispersion, and thus optimization of the dispersion compensation coefficients. As these coefficients approach an optimum value, the partially compensated sample stream 26 obtained by tapping the dispersion compensators 16 becomes increasingly useful for recovering symbol phase, thereby enabling initialization of the clock recovery loop 24.

Figure 8:
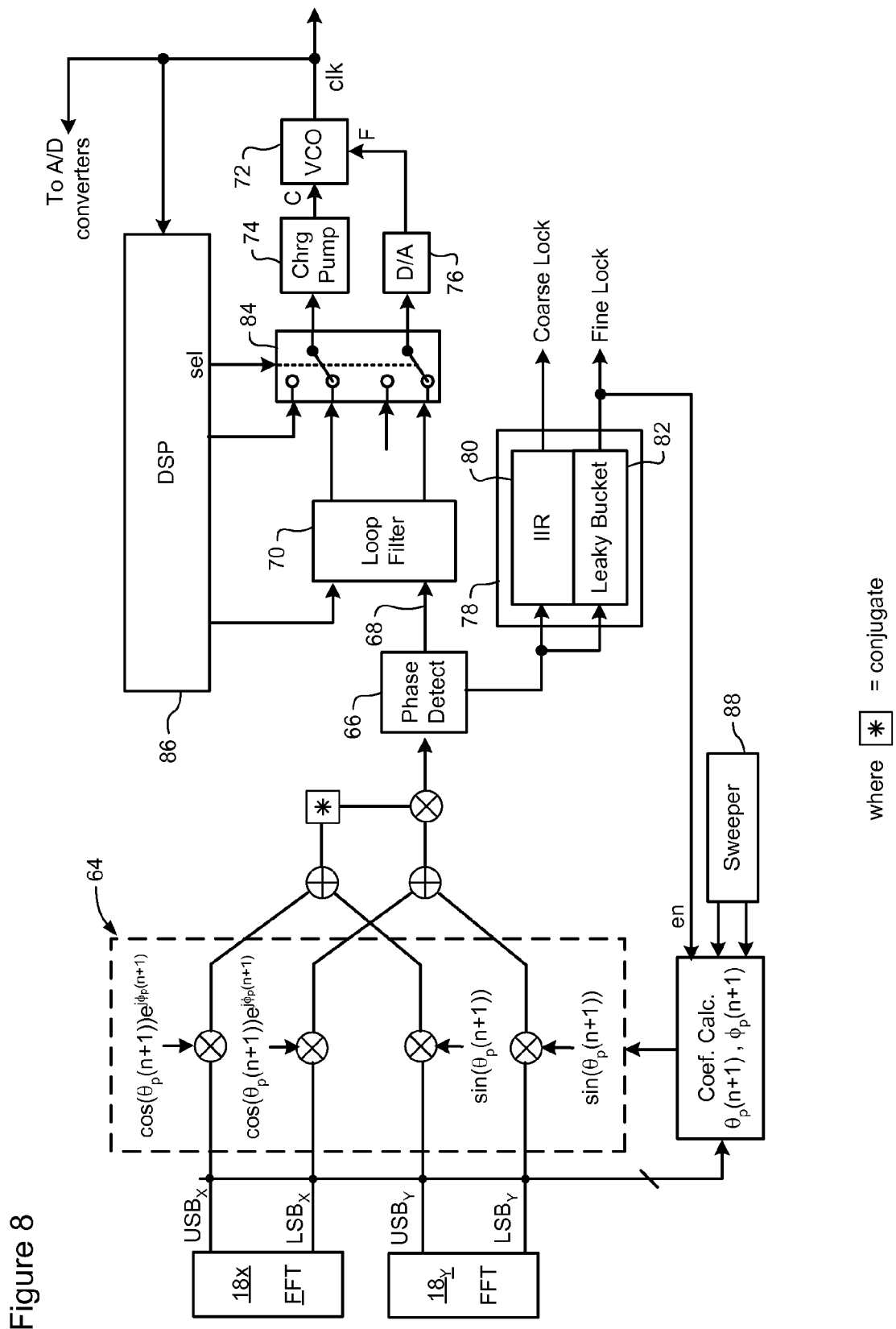
FIG. 8 is a block diagram schematically illustrating principal elements and operations of a clock recovery block usable in an embodiment of the present invention.

Preferably, the clock recovery circuit 24 implements the methods described in Applicant's co-pending U.S. patent application Ser. Nos. 11/315,342 and 11/315,345 filed Dec. 23, 2005, the entire contents of both of which are hereby incorporated herein by reference. FIG. 8 is a block diagram illustrating a representative embodiment of a clock recovery circuit 24 known from the Applicants United States Patent Applications mentioned above.

In the embodiment of FIG. 8, the dispersion compensator FFTs 18 are tapped to obtain respective upper sideband (USB) and lower side band (LSB) signals. These signals are then optimized (at 64) to at least partially compensate polarization impairments, and combined as shown to obtain a complex composite signal which is indicative of a phase relationship between symbols of the received optical signal and the sample timing of the A/D converters 14. A phase detector 66 detects the phase error of the A/D converter sample timing, and outputs a corresponding phase error signal 68 to a loop filter 70. The loop filter includes a first output for driving a voltage controlled oscillator (VCO) 72 via a charge pump 74 to implement coarse tuning of the VCO 72. A second output of the loop filter 70 supplies the VCO via a digital-to-analog D/A converter 76 to implement fine tuning of the VCO 72. With this arrangement, the coarse tuning path can be designed with a wide bandwidth to enable initial capture of the sample phase, and tune the VCO 72 to drive the phase error 68 to within the pull-in range of the fine tuning path. The fine tuning path implements a comparatively low band-width, high precision tuning function, which is designed to achieve and maintain a frequency and phase lock condition.

The operational status of the clock recovery circuit 24 can be determined by means of a lock detection block 78 implementing respective broadband and narrow band filter functions for of the coarse and fine tuning loops. Thus, for example, the coarse tuning path can be used to tune the VCO 72 until a coarse lock indication is generated by an infinite impulse response (IIR) filter 80 of the lock detection block 78. When coarse lock is achieved, operation continues using the fine tuning loop to tune the VCO 72. A leaky-bucket filter 82 of the lock detection block 78 can conveniently be used to output a fine lock indication when a frequency/phase lock condition has been achieved.

In the embodiment of FIG. 8, a switch function 84 is used to enable a digital signal processor (DSP) 86 to drive the VCO 72 during an initial phase of operation, prior to acquisition of a detection of lock condition. With this arrangement, the clock recovery circuit 24 can generate a nominal clock having a desired frequency, so that the A/D converters 14 can sample the photodetector signals (albeit with an unknown sample timing), and the dispersion compensator FFTs 18 can process the resulting sample streams to yield USB and LSB signals that are usable by the clock recovery circuit 24. This enables the phase detector 66 to obtain a valid phase error value, and the coarse tuning path to begin to tune the VCO 72.

In the embodiment of FIG. 8, the optimization block 64 applies a pair of coefficients, $\theta_p$ and $\phi_p$ which are updated at a predetermined rate to at least partially compensate polarization impairments of the received optical signal. When the received optical signal contains significant amounts of Polarization Mode Dispersion (PMD) and/or Polarization Dependent Loss (PDL), there are conditions under which the clock recovery circuit of FIG. 8 cannot reliably obtain a lock condition. For example, consider a condition in which two components of the received optical signal are out of phase (due to PMD) by about ½ of a symbol period. In an out-of lock condition, clock phase estimates 68 generated by the phase detector 66 will exhibit random excursions that average near zero. Consequently, successive updates to the coefficients $\theta_p(n+1)$ and $\phi_p(n+1)$ will also be near to zero, and thus the optimization block 64 will be effectively "frozen". The resulting inability of the optimization block 64 to track polarization transients reduces the likelihood of acquiring a locked condition. This situation may persist for an indeterminate amount of time. In order to overcome this difficulty, a sweeper function 88 can be implemented to force the coefficients $\theta_p$ and $\phi_p$ to slowly scan the entire Poincaré sphere. Enabling this sweeping operation during signal acquisition guarantees that the clock recovery circuit 24 can successfully acquire signal and achieve a phase/frequency lock condition. In the embodiment of FIG. 8, the sweeper function 88 is disabled by the fine lock indicator signal.

The arrangement of FIG. 8 enables robust signal acquisition and achievement of a lock condition in the presence of moderate to severe dispersion and polarization impairments.

Polarization Compensation

In the embodiment of FIG. 1, a training loop including a SYNC detector 32 and a coefficient calculator 34 computes updated filter coefficients which are downloaded to the polarization compensator 30 to track and compensate polarization impairments. Successful initialization of the clock recovery, LO control and dispersion compensation functions, as discussed above, ensures that the residual impairments of the sample stream are within the pull-in range of the training loop, provided that the polarization rotation rate does not exceed an upper limit determined by the update rate of the training loop.

In some embodiments, the polarization compensation training loop implements the methods described in Applicant's co-pending U.S. patent application Ser. No. 11/294, 613 filed Dec. 6, 2005, the contents of which are hereby incorporated herein by reference. Thus, for example, the SYNC detector 32 may operate to compute a correlation between the dispersion compensated sample stream 28 emerging from the polarization compensators 16, and a known SYNC symbol sequence embedded within the received optical signal. Based on the resulting correlation, the coefficient calculator 34 can derive a set of filter coefficients which, when downloaded to the polarization compensator 30, operate to de-convolve the transmitted polarizations from the dispersion compensated sample streams 28.

Representative SYNC symbol sequences of the type which may be used for this purpose are described in Applicant's co-pending U.S. patent application Ser. No. 11/328,199 filed Jan. 10, 2006, the contents of which are hereby incorporated herein by reference.

As will be appreciated, the accuracy with which this can be accomplished will be largely dependent on the loop delay (or equivalently, the adaptation delay) of the training loop. In effect, the filter coefficients must be recalculated with sufficient speed and frequency to track changes in the polarization state of the received optical signal. For optical links in which maximum polarization transients of 2KHz or less are expected, a recalculation frequency as low as 10KHz may be sufficient. As the anticipated polarization transient rates increase, so too must the recalculation frequency of the filter coefficients. Thus, in some embodiments, recalculation rates in excess of 100KHz will be desired.

In the embodiment of FIG. 1, the polarization compensator 30 is cascaded downstream of the dispersion compensators 16. This arrangement is advantageous in that it permits a very low filter width of the polarization compensator 30. For example, in some embodiments, the dispersion compensators 16 may have a filter width in excess of 100 taps, while the polarization compensator 30 has a filter width of less than 10 taps. The small width of the polarization compensator 16 yields a correspondingly low adaptation delay of the polarization training loop.

In some embodiments, the SYNC sequence may be repeated at a frequency of about 1000 times lower than the symbol rate of the optical communications signal. Thus, for an optical communications system in which the symbol rate is 10 GHz, the SYNC repetition frequency will be about 10 MHz. The small size of the polarization compensator 30 enabled by cascading the polarization compensator 30 downstream of the dispersion compensators 16 means that the SYNC detector 32 and coefficient calculator 34 can form a "high-speed" training loop capable of re-computing and downloading the filter coefficients during the interval between successive SYNC sequences. Such frequent coefficient updating facilitates near real-time tracking and compensation of polarization transients having rates well in excess of 50KHz.

Figure 9:
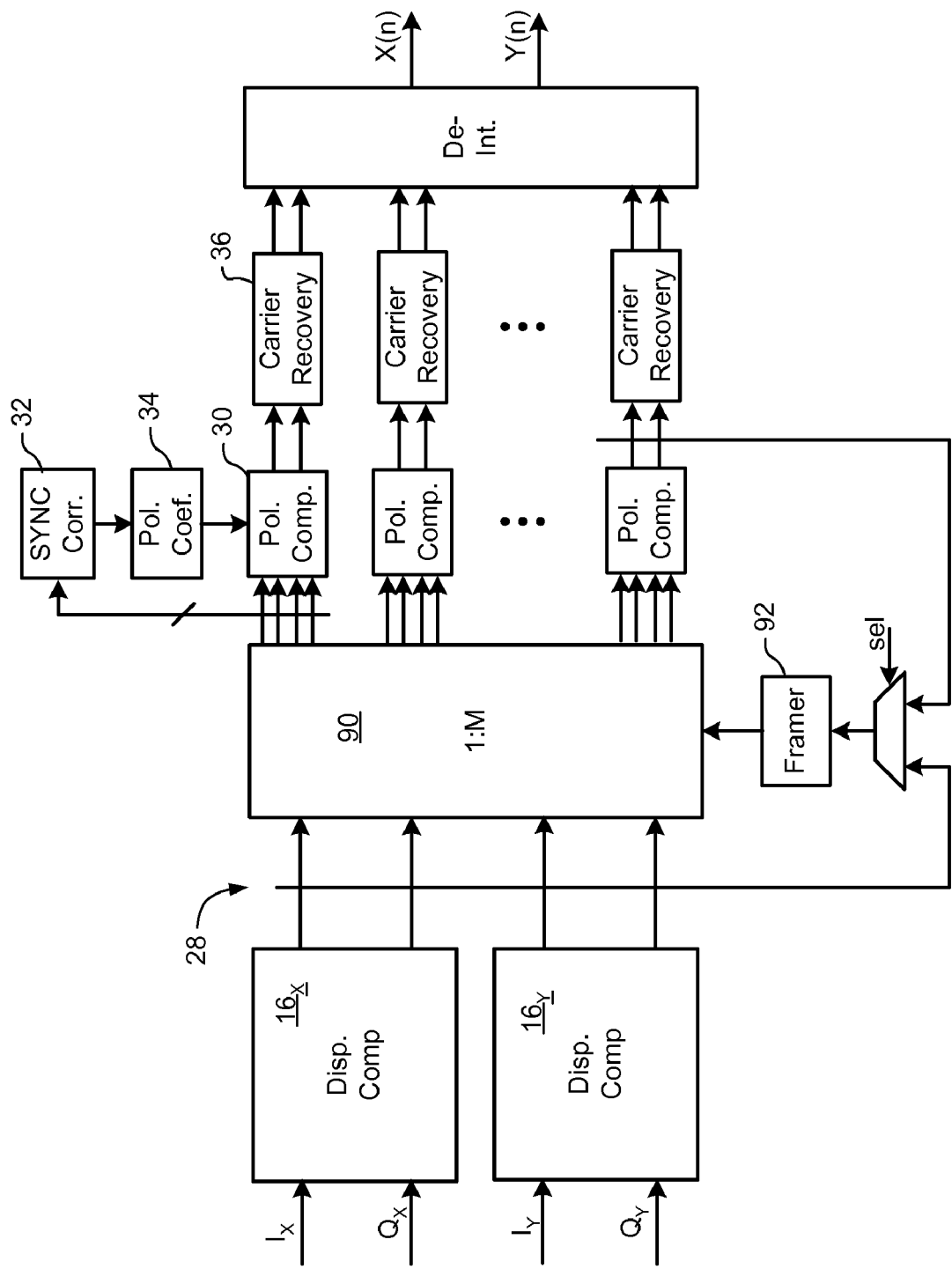
FIG. 9 is a block diagram schematically illustrating principal elements and operations of a framer and signal distribution unit usable in an embodiment of the present invention.

In the embodiment of FIG. 1, the coherent optical receiver includes a single data path. In some cases, it will be desirable to provide multiple parallel data paths, each of which operates at a correspondingly lower clock speed. FIG. 9 illustrates an embodiment in which the dispersion-compensated sample streams 28 appearing at the output of the dispersion compensators 16 are supplied to a 1:M distribution unit 90, which operates to divide the signal path, by selectively routing blocks of samples from the dispersion compensators 16 into each one of M paths. Within each path, a respective polarization compensator 30 operates to de-convolve the transmitted I and Q signal components of each polarization from the dispersion-compensated sample streams. The distortion-compensated sample streams appearing at the output of each polarization compensator 30 are then supplied to a respective carrier recovery block 36 for detection of data symbols and recovery of data.

In the illustrated embodiment, the distribution unit 90 is implemented as a "burst switch" controlled by a framer 92, to generate overlapping blocks of samples. One implementation of a burst switch may, for example, include a multi-port Random Access Memory (RAM), which allows samples to be simultaneously supplied to two or more data paths. This arrangement offers the advantage that each sample block contains sufficient information, in its respective SYNC burst (s), to enable polarization compensation and data decoding substantially independently of any other data path.

The framer 92 may, for example, use various correlation techniques to detect the timing of each SYNC burst within the dispersion compensated sample stream(s) 28. In one embodiment, techniques similar to those described above for clock recovery can be used to enable detection of SYNC bursts even in the presence of severe polarization impairments. As may be appreciated, during signal acquisition, it is not necessary for the framing operation to be perfect. In fact, it is sufficient that the framer 92 control the distribution unit 90 with sufficient accuracy that each sample block supplied to each data path contains an intact SYNC burst. When this condition is satisfied, the SYNC detector 32 and coefficient calculator 34 can successfully operate to provide compensation of the polarization impairments. Once the polarization compensators 30 have stabilized, the framer 92 can use the polarization compensated sample streams to accurately determine the SYNC burst timing.

Figure 10:
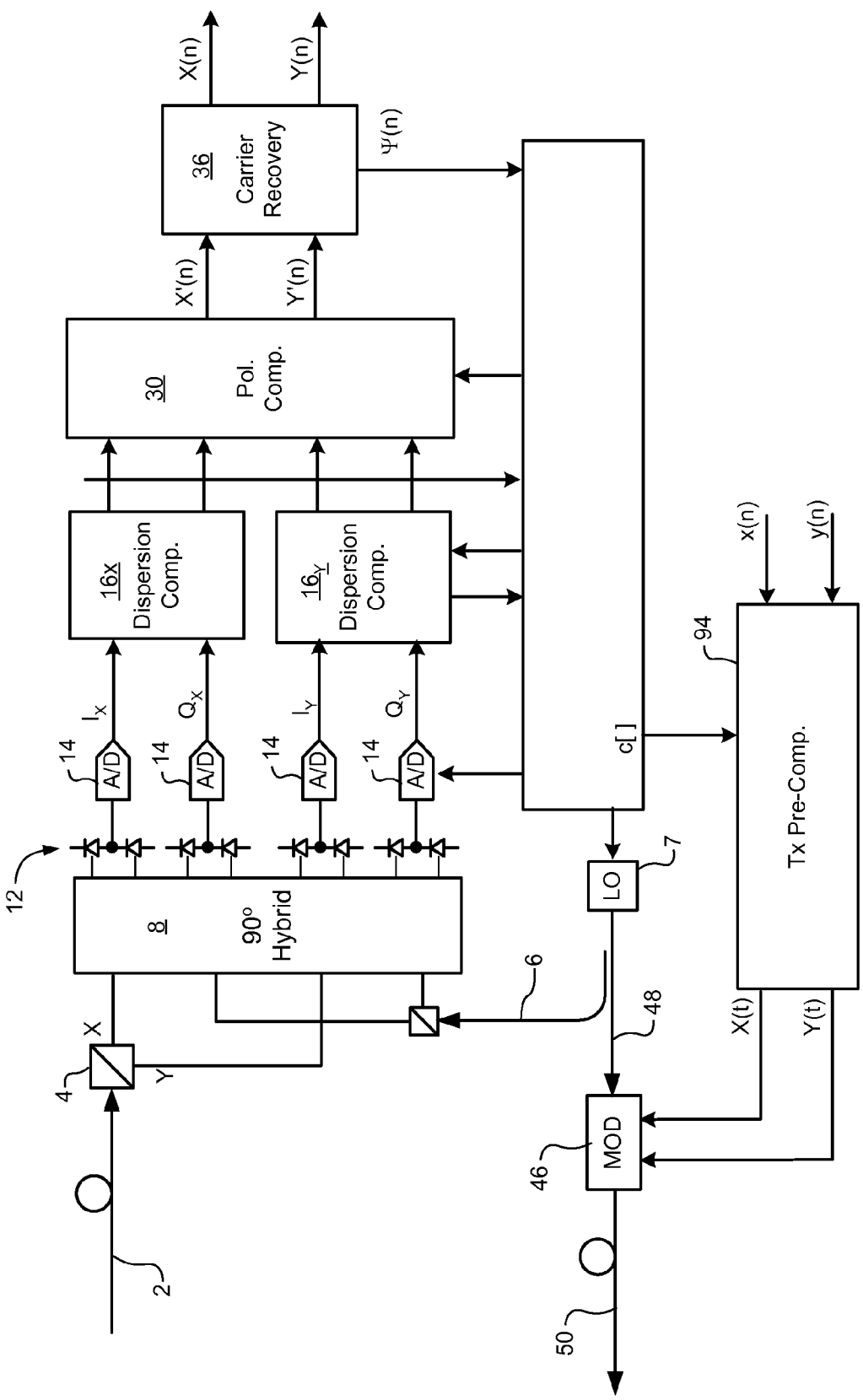
FIG. 10 is a block diagram schematically illustrating a line card having a coherent optical receiver and a transmitter having an electrical pre-compensator, and in which a common LO is used for both transmission and coherent reception functions.

FIG. 10 illustrates a line card similar to that illustrated in FIG. 4, in which the transmitter is provided with an electronic precompensator 94 of the type known, for example, from applicant's co-pending U.S. patent application Ser. Nos. 10/307,466, 10/262,944, and 10/405,236. In the embodiment of FIG. 10, various parameters can be passed between the coherent optical receiver and the electronic precompensator 94 of the transmitter. For example, the measured link dispersion, and/or the dispersion compensation coefficients computed for the coherent optical receiver, may be passed to the electronic precompensator 94 for use in processing outbound signal traffic to synthesize a pre-compensated optical signal for transmission. Polarization coefficients computed by the polarization compensation control loop as described above may be treated in a similar manner so as to enable the electronic precompensator to precompensate polarization effects of the optical link.

Link phenomena such as dispersion, nonlinearities and polarization effects can be directly estimated or parameterized, or proxy parameters can be used. For example, dispersion can be directly parameterized as D picoseconds per nanometer, or other convenient units. Alternatively, general phase shift effects due to phenomena like dispersion can be parametrized in a manner that is convenient to the particular hardware or firmware implementation.

A nonlinear equalization block can compensate for hardware impairments and for some optical nonlinearities. This block benefits from initialization after major impairments, such as large amounts of dispersion, have been at least partially equalized.

Hard and or soft decision Forward Error Correction (FEC) blocks can be used to reduce the effects of noise.

These can be single blocks, multiple, or iterated along with multiple equalization blocks. A Soft FEC outputs multibit samples that generally have reduced noise, compared to the input samples. FEC blocks benefit from initialization, such as FEC frame acquisition, after impairments have been at least partially equalized by upstream stages within the coherent receiver.

The embodiments of the invention described above are intended to be illustrative only. The scope of the invention is therefore intended to be limited solely by the scope of the appended claims.

We claim:

1. In an optical communications system including an optical link terminated by a coherent optical receiver, a method of initializing the coherent optical receiver comprising steps of:
    detecting an optical signal; and
    digitally processing a multi-bit digital sample stream of the optical signal to find receiver parameters which, when downloaded to a dispersion compensator of the coherent optical receiver, compensate link impairments with sufficient accuracy that residual distortions are within a pull-in range of at least one adaptation loop of the receiver;
    downloading the found receiver parameters to the dispersion compensator and processing the multi-bit digital sample stream using the dispersion compensator; and
    supplying an output of the dispersion compensator to the at least one adaptation loop of the receiver;
    wherein the at least one adaptation loop comprises a clock recovery block of the receiver.

2. A method as claimed in claim 1, wherein the step of detecting the optical signal comprises a step of sampling a photo-detector current using a nominal clock to generate the multi-bit digital sample stream with an indeterminate sample phase.

3. A method as claimed in claim 2, wherein the step of digitally processing a multi-bit digital sample stream comprises steps of:
    selecting a set of one of more compensation coefficients which, when downloaded to a dispersion compensator of the coherent optical receiver, will at least partially compensate a dispersion of the optical link;
    processing the multi-bit digital sample stream using the set of compensation coefficients to generate a second multi-bit digital sample stream; and
    detecting a residual dispersion of the second multi-bit digital sample stream sample stream.

4. A method as claimed in claim 3, further comprising a step of adjusting the estimated total dispersion of the optical link based on the detected residual dispersion.

5. A method as claimed in claim 4, wherein the steps of selecting a set of one of more compensation coefficients; processing the multi-bit digital sample stream; detecting a residual dispersion; and adjusting the estimated total dispersion, are repeated until a selected dispersion optimization criterion is satisfied.

6. A method as claimed in claim 5, wherein the dispersion optimization criterion comprises any one or more of: a local minimum of the residual dispersion is found; the residual dispersion is less than a predetermined tolerance value; a local maximum of a correlation between the second multi-bit digital sample stream and a predetermined symbol sequence is found; or the correlation is greater than a predetermined threshold.

7. A method as claimed in claim 5, further comprising a step of sending either one or both of the estimated total dispersion and the selected dispersion coefficients to an optical signal transmitter.

8. A method as claimed in claim 7, wherein the optical transmitter is located at a remote node, for transmitting the optical signal to the coherent optical receiver through the optical link.

9. A method as claimed in claim 7, wherein the optical transmitter is co-located with the coherent optical receiver, for transmitting a second optical signal through the optical link to a remote node.

10. A method as claimed in claim 2, further comprising initializing the clock recovery block including steps of:
    tapping the dispersion compensator of the coherent optical receiver to obtain an at least partially dispersion compensated sample stream; and
    processing the at least partially dispersion compensated sample stream to derive a clock signal that is substantially phase locked with symbols of the optical signal.

11. A method as claimed in claim 10, further comprising a step of sampling the photo-detector current using the derived clock, so as to generate the multi-bit digital sample stream with a known sample phase.

12. A method as claimed in claim 2, further comprising initializing the clock recovery including steps of:
    tapping a dispersion compensator of the coherent optical receiver to obtain an at least partially dispersion compensated sample stream; and
    processing the at least partially dispersion compensated sample stream to derive a clock signal that is substantially frequency locked with symbols of the optical signal.

13. A method as claimed in claim 10, further comprising a step of sampling the photo-detector current using the derived clock, so as to generate the multi-bit digital sample stream with a known sample frequency.

14. A method as claimed in claim 1, wherein the step of digitally processing a multi-bit digital sample stream further comprises a step of initializing a local oscillator (LO) control loop.

15. A method as claimed in claim 14, wherein the step of initialising the LO control loop comprises a step of iteratively adjusting an LO frequency setting until a predetermined LO optimization criterion is satisfied.

16. A method as claimed in claim 15, wherein the step of iteratively adjusting an LO frequency setting comprises either one of: iteratively adjusting a default frequency setting value $f_0$; and iteratively adjusting a frequency adjustment value $\Delta F$.

17. A method as claimed in claim 15, wherein the predetermined LO optimization criterion comprises any one of: a local minimum of a residual distortion of the multi-bit digital sample stream is found; the residual distortion is less than a predetermined tolerance value; a local maximum of a correlation between the multi-bit digital sample stream and a predetermined symbol sequence is found; and the correlation is greater than a predetermined threshold.

18. A method as claimed in claim 15, wherein the step of initializing the LO control loop is performed simultaneously with initializing the dispersion compensation block.

19. A method as claimed in claim 18, wherein a common optimization criterion is used for initializing both the LO control loop and the dispersion compensation block.

20. A method as claimed in claim 15, wherein the common optimization criterion comprises either one of: a correlation between a predetermined symbol sequence and a compensated multi-bit digital sample stream at an output of a dispersion compensator of the coherent optical receiver is a local maximum; and, the correlation is greater than a predetermined threshold.

21. A method as claimed in claim 20, wherein an update rate of the LO frequency setting is different from that of the dispersion compensation block.

22. A method as claimed in claim 15, further comprising steps of:
   detecting a phase error of the multi-bit digital sample stream; and
   dynamically controlling the LO frequency setting based on the detected phase error.

23. A method as claimed in claim 1, wherein the step of digitally processing a multi-bit digital sample stream further comprises steps of:
   detecting successful initialization of the dispersion compensation block and the clock recovery block, and
   thereafter initializing a polarization compensation loop of the coherent optical receiver.

24. A method as claimed in claim 23, wherein the step of initializing the polarization compensation loop comprises steps of:
   computing a correlation between a predetermined symbol sequence and a dispersion compensated multi-bit digital sample stream generated by the dispersion compensation block; and
   deriving a set of one or more polarization compensation coefficients based on the computed correlation.

25. A method as claimed in claim 24, further comprising a step of sending either one or both of the computed correlation and the set of one or more polarization compensation coefficients to an optical signal transmitter.

26. A method as claimed in claim 25, wherein the optical transmitter is located at a remote node, for transmitting the optical signal to the coherent optical receiver through the optical link.

27. A method as claimed in claim 25, wherein the optical transmitter is co-located with the coherent optical receiver, for transmitting a second optical signal through the optical link to a remote node.

28. A method as claimed in claim 1, wherein the step of digitally processing a multi-bit digital sample stream further comprises steps of:
   detecting successful initialization of the dispersion compensation block and the clock recovery block, and
   thereafter initializing a framer of the coherent optical receiver.

29. A method as claimed in claim 28, wherein the step of initializing the framer comprises a step of detecting a timing of a predetermined symbol sequence within a dispersion compensated multi-bit digital sample stream generated by the dispersion compensation block.

30. A method as claimed in claim 1, wherein the step of digitally processing a multi-bit digital sample stream further comprises steps of:
   detecting successful initialization of the dispersion compensation block and thereafter initializing a carrier recovery block of the coherent optical receiver.

31. A method as claimed in claim 1, wherein the step of digitally processing a multi-bit digital sample stream further comprises steps of:
   detecting successful initialization of the dispersion compensation block and thereafter initializing a polarization-effects block.

32. A method as claimed in claim 1, wherein the step of digitally processing a multi-bit digital sample stream further comprises steps of:
   detecting successful initialization of the dispersion compensation block and thereafter initializing a nonlinear equalizer.

33. A method as claimed in claim 1, wherein the step of digitally processing a multi-bit digital sample stream further comprises steps of:
   detecting successful initialization of the dispersion compensation block and thereafter initializing a forward error correction block.

34. A method as claimed in claim 1, wherein the step of digitally processing a multi-bit digital sample stream further comprises steps of:
   Equalization of the multibit digital sample stream;
   Followed by noise reduction;
   Followed by further equalization.

* * * * *